(No Model.)
D. N. HESLER.
CULTIVATOR.
No. 598,422. Patented Feb. 1, 1898.
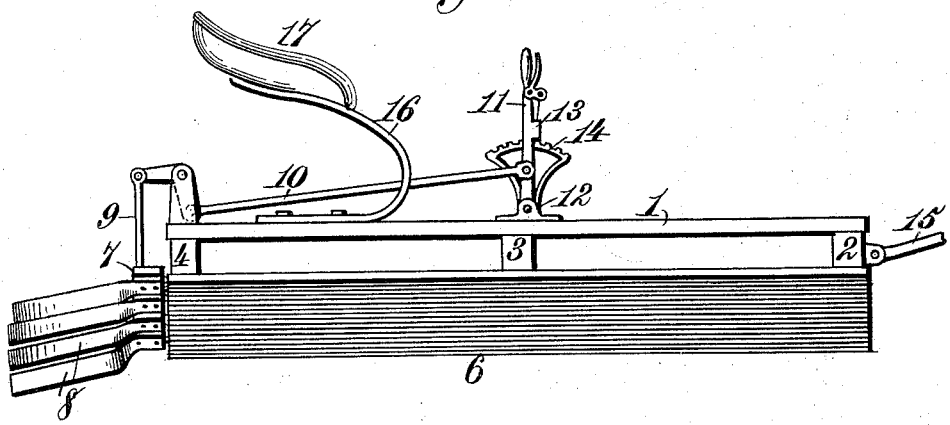
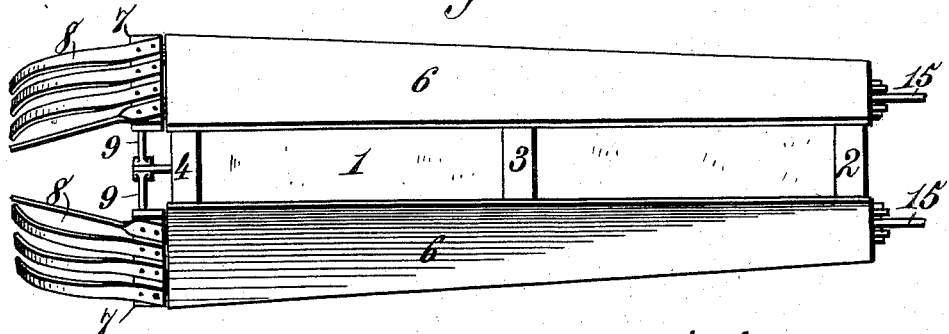
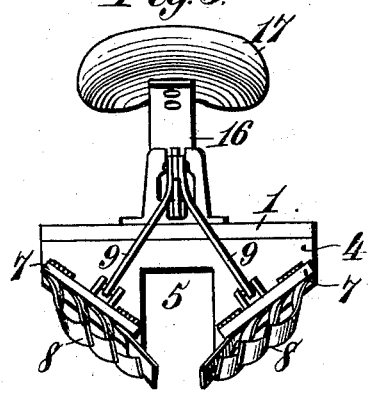
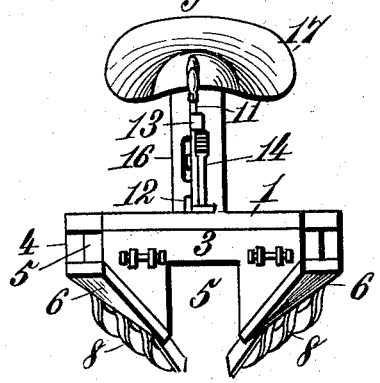
Witnesses
Robert Everitt
Inventor
Dock N. Hesler.
By James L. Norris.
Atty.

UNITED STATES PATENT OFFICE.

DOCK N. HESLER, OF GALLATIN, MISSOURI.

CULTIVATOR.

SPECIFICATION forming part of Letters Patent No. 598,422, dated February 1, 1898.

Application filed August 26, 1897. Serial No. 649,626. (No model.)

*To all whom it may concern:*

Be it known that I, DOCK N. HESLER, a citizen of the United States, residing at Gallatin, in the county of Daviess and State of Missouri, have invented new and useful Improvements in Cultivators for Cultivating Listed Corn, of which the following is a specification.

This invention relates to a cultivator for cultivating listed corn, and has for its object to provide a cultivator that may be used to cultivate listed corn when it is quite small and which will operate to effectually and thoroughly pulverize the soil, level down the high places, and fill up the low places, leaving the sides of the furrow smooth and regular, and will throw the finely-pulverized soil from the sides of the furrow onto the listed corn.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a side elevation of my improved cultivator. Fig. 2 is a bottom view thereof. Fig. 3 is a rear elevation, and Fig. 4 is a front elevation, thereof.

Referring to the drawings, the numeral 1 indicates a horizontal platform trapezoidal in shape and gradually increasing in width from its front to its rear end. To the under side of the platform 1, at its opposite ends and intermediate its ends, are firmly attached brackets 2, 3, and 4, said brackets having inclined sides, as shown, and recessed or cut away centrally, as at 5, to straddle the rows of corn. The bracket 3 is wider than the bracket 2, and the bracket 4 is wider than the bracket 3, whereby the angle formed by the inclined sides of any one of the brackets is greater or more obtuse than the angle formed by the inclined sides of the bracket immediately in front of it, for the purpose hereinafter made apparent.

Attached to the opposite inclined edges of the brackets are runner-boards 6, which gradually increase in width from their front to their rear ends and which may be formed of wood or metal, as may be preferred. Owing to the difference in the angles formed by the inclined sides of the brackets, as before described, when the runner-boards are attached to the brackets a torsional twist is communicated to them—that is to say, each board is gradually twisted outward and upward away from a flat plane from its front to its rear end, thus communicating an outwardly-flaring swell to the runner-boards for the purpose hereinafter described. The brackets 2, 3, and 4 not only increase in width in the order named, but also increase in depth in the same manner, whereby the runner-boards lie at an angle to the platform 1—that is to say, the rear portions of the runner-boards are lower than the front portions.

Hinged to the rear face of the bracket 4, parallel with the inclined edges of the latter, are two flat bars 7, to each of which are rigidly attached knives 8, said knives being given a slight torsional twist and gradually turned inward toward their rear ends and slightly projected downward, as shown. To each of the bars 7 is attached a rod 9, said rods at their upper ends being suitably connected to a connecting-rod 10, as shown, which at its forward end is pivotally attached to a hand-lever 11, pivoted to a support 12 and provided with a latch 13, of ordinary and well-known construction, adapted to engage a toothed segment 14, fixed on the said support and operating to hold the hand-lever in its adjusted position in the usual manner. By rocking the hand-lever the pivoted bars carrying the knives may be operated to raise and lower the knives in a manner that will be apparent.

Attached to the forward end of the cultivator are draft-rods 15, while fixed on the rear portion of the platform 1 is a seat-support 16, carrying a seat 17.

The operation of my improved cultivator is as follows: The cultivator is run in the furrow in such manner that the runner-boards straddle the row of corn, the central apertures 5 in the brackets permitting the cultivator to pass over the corn without injury to the latter. Owing to the twist imparted to the runner-boards and to the fact that the latter are smallest at their forward portion, the front ends of said runner-boards stand up sufficiently near to the vertical to insure them passing between all the clods in the furrow, and as the runner-boards widen out and flare down and out toward their rear as they pass over the clods they press the same down more firm against the sides of the furrow, and by so pressing the clods and by exerting a rubbing action thereon the clods are finely and thoroughly pulverized, and at the same time the high places in the soil are lowered and the low places are filled up, thereby leaving the sides of the furrow smooth and regular for the knives to operate in. The knives work in the fine earth, forming the sides of the furrow, the outermost knife of each series operating on the top of the adjacent ridge of earth. The lower edges of the knives cut into the fine soil, and their rear inwardly-curved ends draw the soil toward the corn. By raising and lowering the knives by the means described the depth to which the knives will operate may be regulated at the will of the operator.

Having described my invention, what I claim is—

1. In a cultivator, the combination with a frame arranged to straddle the plants of oppositely-inclined runner-boards carried on the under side of the frame, said runner-boards being torsionally twisted substantially as shown and for the purpose specified.

2. In a cultivator, the combination with a frame arranged to straddle the plants, of oppositely-inclined runner-boards carried on the under side of the frame and having an outwardly-flaring swell gradually increasing from the forward to the rear portions of said runner-boards, substantially as shown and for the purpose specified.

3. In a cultivator, the combination with a frame arranged to straddle the plants, of oppositely-inclined runner-boards carried on the under side of the frame, said runner-boards gradually increasing in width from their front toward their rear ends and torsionally twisted as shown and for the purpose specified.

4. In a cultivator, the combination with a frame arranged to straddle the plants, of oppositely-inclined runner-boards carried on the under side of the frame, said runner-boards gradually increasing in width and depth from their front toward their rear ends and torsionally twisted as shown and for the purpose specified.

5. In a cultivator, the combination with a frame arranged to straddle the plants, of oppositely-inclined runner-boards carried on the under side of the frame and having an outwardly-flaring swell gradually increasing from the forward to the rear portions of said runner-boards, and two series of inwardly-curved knives arranged on the rear of the frame and operating to draw the pulverized soil about the plants, substantially as described.

6. In a cultivator, the combination with a frame arranged to straddle the plants, of oppositely-inclined runner-boards carried on the under side of the frame and having an outwardly-flaring swell gradually increasing from the forward to the rear portions of said runner-boards, and two series of vertically-adjustable and inwardly-curved knives arranged on the rear of the frame and operating to draw the pulverized soil about the plants, substantially as described.

7. The combination with the horizontal platform 1, of the brackets 2, 3 and 4 attached to the under side of the ends and intermediate the ends of the frame and having central apertures and oppositely-inclined sides, each bracket being wider and deeper and having its sides inclined at a more obtuse angle than the bracket immediately preceding it, and runner-boards 6 rigidly attached to the inclined sides of said brackets and gradually increasing in width from their front toward their rear ends, substantially as described and for the purpose specified.

8. In a cultivator, the combination with a frame arranged to straddle the plants and oppositely-inclined runner-boards carried on the under side of the frame and having an outwardly-flaring swell gradually increasing from the forward to the rear portions of said runner-boards, of two flat bars 7 hinged to the rear portion of said frame and each provided with a plurality of rearwardly and inwardly curved knives, and means for rocking said bars to vertically adjust said knives, substantially as described and for the purpose specified.

In testimony whereof I have hereunto set my hand in presence of two subscribing witnesses.

DOCK N. HESLER.

Witnesses:
  WM. D. WILLIAMS,
  O. DUNSTON.